Sept. 13, 1955     A. J. GOMES     2,717,446
SCRIBING AND LAYOUT INSTRUMENT
Filed July 8, 1952     2 Sheets-Sheet 1
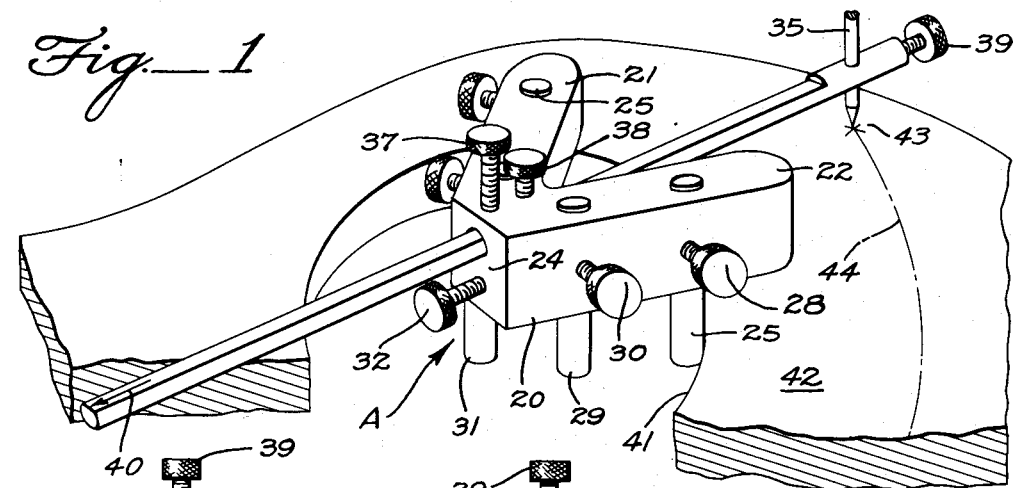
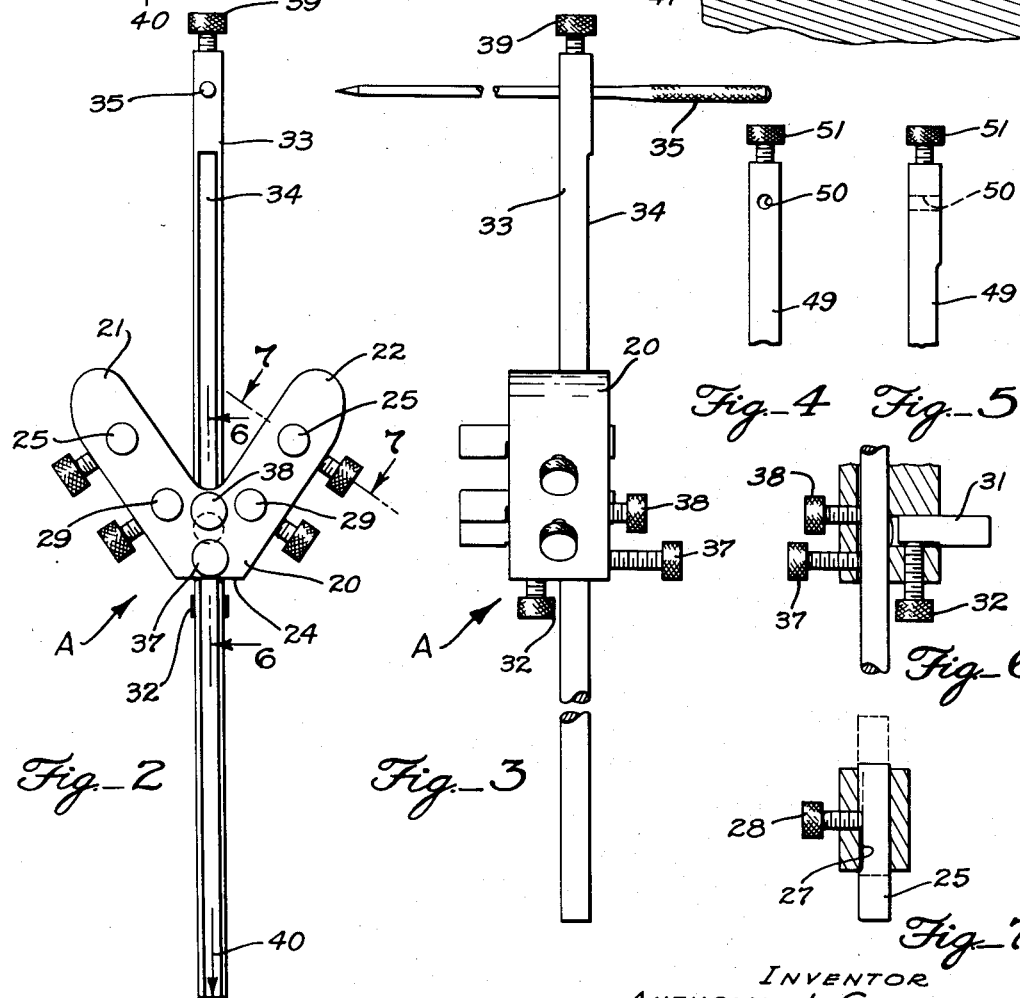
INVENTOR
ANTHONY J. GOMES Sept. 13, 1955 A. J. GOMES 2,717,446
SCRIBING AND LAYOUT INSTRUMENT
Filed July 8, 1952 2 Sheets-Sheet 2
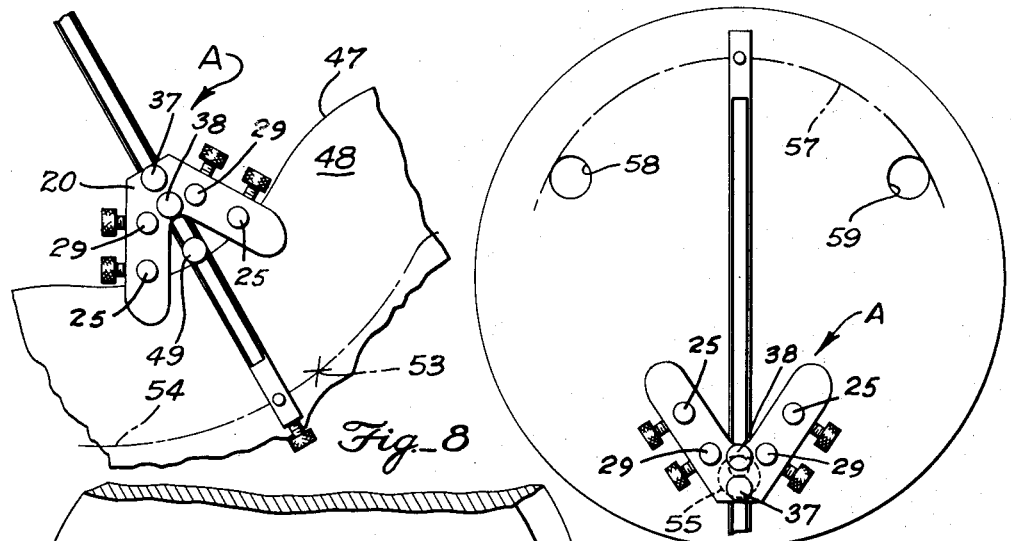
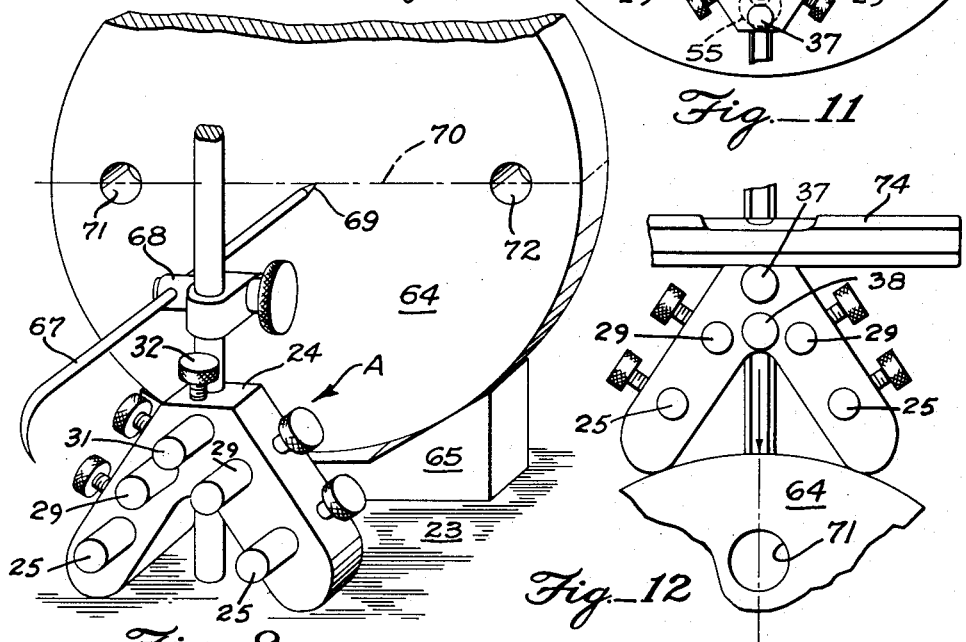
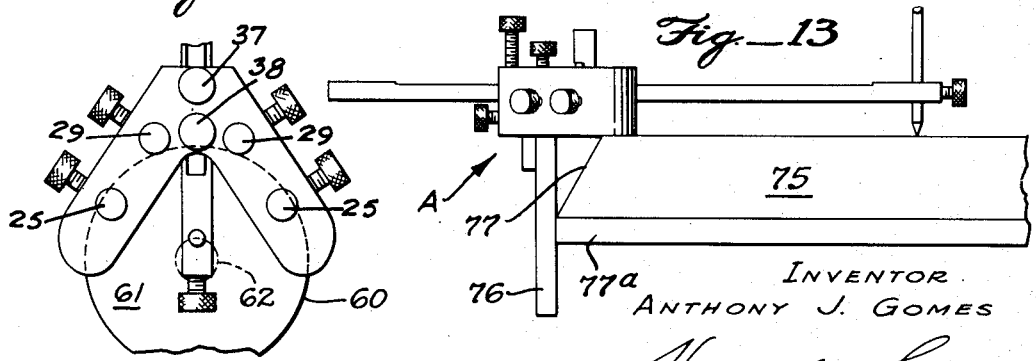
INVENTOR.
ANTHONY J. GOMES
By Hansen and Lane
ATTORNEYS

United States Patent Office 2,717,446
Patented Sept. 13, 1955

2,717,446

SCRIBING AND LAYOUT INSTRUMENT

Anthony J. Gomes, Santa Clara, Calif.

Application July 8, 1952, Serial No. 297,675

3 Claims. (Cl. 33—42)

The present invention relates to a lay-out instrument, and pertains more particularly to an instrument for scribing lines and points on a work piece for guidance in the machining of the work piece.

In the past, various types of scribing and lay-out instruments have been devised and many such instruments are commonly used, for example, in the making of machine tools and dies. Some of these prior instruments employ a block-like body with a pair of pins mounted therein, and with a center scriber support rod mounted adjustably in the body so that the device can be used in scribing a line a predetermined distance from a desired edge of a part to be marked. Such previous instruments, however, have been somewhat limited in their field of use.

The present invention contemplates the provision of an improved marking instrument for use in laying out work for machining.

It is also an object of the invention to provide a layout instrument which is adaptable to scribing lines a predetermined distance from straight and curved edges, the instrument being adaptable for accurately scribing lines from curved edges having either large or small radii of curvature.

A further object of the invention is to provide an instrument useful in checking hole spacing and for scribing and laying out work supported on a surface plate or V-block.

These and other objects and advantages of the invention will be apparent from the following description and the accompanying drawings, wherein:

Fig. 1 is a perspective view of an instrument embodying the invention, the instrument being shown as it is used for inscribing a line on a work piece.

Fig. 2 is a plan view of the instrument shown in Fig. 1.

Fig. 3 is a side elevational view of the instrument shown in Fig. 2, portions of a scriber, and of an adjustable scriber support rod, being broken away.

Figs. 4 and 5 are side elevational views taken at angles of 90° from each other, of a guide pin which is adapted to be secured to the scriber pin support rod when the instrument is used as shown for example, in Fig. 8.

Fig. 6 is a fragmentary sectional view taken along line 6—6 of Fig. 2.

Fig. 7 is a sectional view taken along line 7—7 of Fig. 2.

Fig. 8 is a plan view in reduced scale of the instrument as used for marking a line a predetermined distance from an edge having a reverse curve therein, a fragment of the work piece being shown.

Fig. 9 is a perspective view of the instrument as it is used in laying out work supported on a surface plate and V-block.

Fig. 10 is a plan view of the device as it is used for scribing a line a predetermined distance from an edge having a small radius of curvature.

Fig. 11 is a plan view of the device as it is used for checking distances between holes.

Fig. 12 is a fragmentary view of the device as it is used for setting up a work piece, such as that shown in Fig. 9 for example, for drilling a hole radially into a work piece.

Fig. 13 is a side elevational view of the device as it is employed for use on a work piece having beveled or offset edge portions.

The illustrated embodiment of the invention comprises an instrument A having a V-shaped body block 20 with the two angularly diverging legs 21 and 22 thereof of equal length. The upper and lower surfaces of the body 20 are flat and are parallel to each other. The outer ends of the legs 21 and 22 are cylindrically rounded and are tangent to a common plane perpendicular to the bisector of the angle defined by the two legs 21 and 22, and to the planes of the flat top and bottom surfaces of the body 20. This common plane of tangency is represented in Fig. 9 by the upper surface of a conventional surface plate 23.

A flat surface 24 is formed on the outer side of the apex of the body 20, and this surface 24 is parallel to the common plane of tangency to the rounded ends of the legs 21 and 22.

A pair of outer guide pins 25, 25, preferably of hard steel rod, are mounted with a close sliding fit in holes drilled transversely through the legs 21 and 22 near their outer ends. The pins 25, 25 are mounted with their axes parallel to each other and to the common plane of tangency of the ends of the legs 21 and 22, and perpendicular to the flat top and bottom surfaces of the body 20.

Each of the pins 25, 25 has a flat face 27 (Fig. 7) extending along a side thereof to provide a seat for the inner end of a set screw 28, one of which is screwed into a threaded hole provided therefor in the outer side of each of the legs 21 and 22. The flat faces 27 on the pins 25 are of sufficient length, and are so located, as to permit the pins to be moved axially, as shown in dotted lines in Fig. 7, upon loosening the set screws 28, 28. Thus the pins 25, 25 may be adjusted to project from either side of the body 20 as desired.

Similar inner guide pins 29, 29 are mounted in a similar manner nearer the apex of the body 20. These inner guide pins 29, 29 are parallel to each other and to the outer pins 25, 25, and are secured in their respective holes in the body 20 by set screws 30, 30 in the same manner as the outer guide pins 25, 25 are secured by their set screws 28, 28.

A short central guide pin 31 (Figs. 1 and 6) is mounted to extend downwardly from a hole provided therefor centrally of the intersection of the legs 21 and 22. The central guide pin 31 is secured in position by a set screw 32 which projects from the flat apex face 24 of the body 20.

A scriber support rod 33 is inserted with a relatively close sliding fit in a hole provided therefor through the body 20 to position the scriber support rod 33 with its axis disposed to bisect the angle defined by the legs 21 and 22 and normal to the flat apex face 24.

The scriber support rod 33 is provided with a flat face 34 along one side therefor. The flat face 34 terminates short of a scriber 35 mounted with a close sliding fit in a hole provided therefor near one end of the support rod 33. Set screws 37 and 38, screwed into threaded holes provided therefor in the body 20, engage the flat face 34 of the support rod 33 to retain it in axially adjusted position in the body 20. The scriber 35 is secured in adjusted position with its axis disposed at right angles to the flat face 34 by a set screw 39, which is screwed into a threaded hole provided therefor axially of the outer end of the rod 33.

An endwise directed arrow 40 (Figs. 1, 2 and 12) is inscribed centrally of the flat face 34 of the support rod 33 at the opposite end of the support rod from the scriber pin 35. The purpose of the arrow 40 will be described later herein.

For scribing a line on a work piece at a predetermined distance from a curved edge of the work piece, for example, from the edge 41 in Fig. 1, the outer pair of guide pins 25, 25 are adjusted to their lower extended position as shown in solid lines in Fig. 7. The instrument A then is placed in position with the outer ends of the legs 21 and 22 of the body 20 beyond the pins 25, 25 resting upon the top surface of the work piece 42 to be inscribed as shown in Fig. 1. A mark 43 is inscribed on the work piece 42 at a desired distance from the curved guiding edge 41.

The set screws 37 and 38 then are loosened to free the scriber support rod for axial movement, and, with the outer guide pins 25, 25 in engagement with the guiding edge 41, the support rod 33 is moved axially within the body 20 to bring the point of the scriber 35 onto the mark 43. The scriber support rod 33 then is secured in adjusted position by again tightening the set screws 37 and 38. The scriber 35 also may be axially adjusted in the support rod 33 as required by loosening the set screw 39 to free the scriber for axial adjustment, and again tightening the set screw after the adjustment has been made. The desired line 44 then may be scribed on the work piece 42 by moving the instrument along the guiding edge 41 of the work piece while retaining the outer guide pins 25, 25 in contact with the guiding edge 41.

For scribing a line a desired distance from an edge of complex or reversed curvature, such as the edge 47 of a work piece 48 (Fig. 8) a guide pin 49 is mounted on the scriber support rod 33 as shown in Figs. 4, 5 and 8. The guide pin 49 has a hole 50 therethrough with its axis disposed at right angles to the axis of the pin 49. The hole 50 is of a size to receive the scriber support rod 33 with a close sliding fit therein. A set screw 51, mounted axially of one end of the pin 49, secures the pin in adjusted position on the scriber support rod 33.

The outer pins 25, 25 are adjusted to extend downwardly from the body 20 as described previously herein for the instrument as shown in Fig. 1. The body 20 then is positioned with the outer ends of the legs 21 and 22 beyond the outer pins 25, 25 resting flat upon the top of the work piece 48 upon which the line is to be scribed. The set screws 37 and 38 are left loose for this operation so that the scriber support rod 33 is free for axial movement in the body 20. The set screws 37 and 38, however, preferably are positioned just clear of the flat face 34 on the scriber support rod 33 to prevent the rod 33 from turning in the body 20.

A mark, such as the point of intersection of the crossed lines 53 on the work piece 48 in Fig. 8, then is marked on the work piece a desired distance from the guiding edge 47. The guide pin 49 then is adjusted on the scriber support rod 33 so that, with the pin 49 in contact with the guiding edge 47, the point of the scriber 35 will rest on the point of intersection of the crossed lines 53. The guide pin 49 then is secured in adjusted position on the scriber support rod 33 by tightening the set screw 51. By maintaining light inward pressure on the body 20 to hold the guide pins 25, 25 in contact with the guiding edge 47, while at the same time maintaining a light independent axially inward pressure on the scriber support rod 33 to hold the guide pin 49 in contact with the guiding edge 47 while moving the instrument A therealong, a line 54 (Fig. 8) may be inscribed on the work piece 48 a desired distance from the guiding edge 47.

For checking the distance between a plurality of holes in a work piece, the device is employed as shown in Fig. 11. In this instance, all four of the guide pins 25, 25 and 29, 29 are adjusted to have their upper ends extending above the body 20, as shown in dotted lines in Fig. 7, the central guide pin 31 being mounted as shown in Fig. 6. The central pin 31 then may be inserted in any hole of a size suitable to receive it, such as the hole 55 indicated in dotted lines in Fig. 11.

By adjusting the scriber support rod 33 axially of the body 20 as described previously herein, the distance between the central pin 31 and the point of the scriber 35 may be adjusted as desired. A line 57 then may be swung to check, for example, the separation of holes 58 and 59 from the hole 55 in which the central pin 31 is inserted.

For inscribing a line a predetermined distance from a curved edge having a short radius of curvature, the device may be employed as illustrated in Fig. 10. In this case, the two outer guide pins 25, 25 are adjusted to their raised dotted line positions shown in Fig. 7, and the inner guide pins 29, 29 are adjusted to project downwardly from the body 20. With the inner guide pins 29, 29 then held in contact with a curved guiding edge 60 of a work piece 61, the scriber support rod 33 may be adjusted to bring the point of the scriber 35 a required distance from the edge 60, and the device then may be moved along the guiding edge to inscribe the required mark 62.

Another useful application of the device is illustrated in Figs. 9 and 12. With a work piece 64, which may be a metal disc, supported in a V-block 65, a scriber 67 mounted in a clamp 68 of a type conventionally employed in machinist's surface gauges is mounted on the scriber support rod 33. The body 20 for this purpose is positioned with the rounded ends of the diverging legs 21 and 22 of the body 20 supported on the surface plate 23. In conformity with the description of the device as set forth previously herein, this positions the scriber support rod 33 perpendicularly to the supporting surface of the surface plate 23.

The scriber 67 then is adjusted to bring its point 69 at a desired height above the surface plate 23, for example, at the height of the center of the disc. A line 70 then is scribed radially of the disc 64 through the centers of one or more holes 71, 72, as shown in Fig. 9. The disc 64 then is rotatively adjusted in the V-block 65 to bring a desired hole 71 at the upper side of the disc 64. The body 20 then is mounted with the rounded ends of the legs 21 and 22 supported on the periphery of the disc 64, with the end of the scriber support rod 33 having the arrow 40 inscribed thereon extending inwardly between the legs 21 and 22 of the body 20.

The V-block 65 then may be mounted on the table of a usual drill press, not shown, and the body 20 moved to bring the arrow 40 into alignment with the inscribed line 70 on the disc 64. A small level 74 then is mounted on the flat surface 24 of the gauge body 20 as shown in Fig. 12. By rotatively adjusting the disc 64 with the arrow 40 held in alignment with the inscribed line 70, the inscribed line 70 intersecting the center of the hole 71 then will be vertical. This positions the disc 64 properly for drilling a hole centrally into the hole 71, an operation required, for example, in the drilling of a hole for a set screw.

In the illustration of Fig. 13, the device is shown with a pair of longer pins 76, substituted for the inner pins 29, 29. These longer pins 76 permit the device to be used in cases where the guiding edge is offset from the surface on which a mark is to be inscribed. As shown in Fig. 13, a work piece 75 has a beveled upper edge portion 77 above a lower guiding edge portion 77a. By substituting the longer pins 76 for the short inner pins 29, 29, these longer pins will extend downwardly to the guiding edge portion 76a so that the device then can be used as described previously herein for Fig. 10.

While I have illustrated and described a preferred embodiment of the present invention, it will be understood, however, that various changes and modifications may be made in the details thereof without departing from the spirit and scope of the invention as set forth in the appended claims.

Having thus described the invention, what I claim as new and desire to protect by Letters Patent is defined in the following claims.

I claim:

1. A scribing and layout tool comprising a body portion having a pair of straight, angularly diverging legs, each leg being rectangular in cross section and intersecting the other with the top and bottom surfaces of said legs defining common planes parallel to each other and to a plane defined by the angle of leg divergence, a curved surface on the outer end of each leg formed to define a plane surface perpendicular to a plane bisecting the leg angle, a pair of guide pins adjustably mounted one in each leg at equal distances from the leg apex, a scriber support rod mounted in said body with its axis bisecting the angle of leg divergence and perpendicular to the plane surface defined by the outer ends of said legs, a center pin removably mounted to project from the intersection of the legs of said body with its axis perpendicularly intersecting the scriber support rod axis, and a scriber adjustably mounted on said scriber support rod.

2. A scribing and layout instrument comprising a body portion having parallel top and bottom surfaces and a pair of legs diverging at an angle parallel to the top and bottom body surfaces, the outer ends of the legs being formed to define a plane perpendicular to the plane defined by the bisector of the angle of leg divergence, a guide pin adjustably mounted in each leg at equal distances from the apex of the angle of leg divergence with the axes of said pins perpendicular to the top and bottom body surfaces, means for securing the guide pins in adjusted position with an end of each thereof projecting beyond a selected one of the top and bottom body surfaces, a scriber support rod adjustably mounted in said body with the support rod axis disposed parallel to said top and bottom body surfaces and bisecting the leg angle, a center pin removably mounted to project from the body at the intersection of the legs thereof, the pin axis perpendicularly intersecting the scriber support rod axis, and a scriber secured in adjusted position on said scriber support rod.

3. An arrangement according to claim 2, the body having a flat surface formed on the apex end thereof parallel to the surface defined by the leg ends.

References Cited in the file of this patent

UNITED STATES PATENTS

| | | |
|---|---|---|
| 379,117 | Lysett | Mar. 6, 1888 |
| 491,840 | Field | Feb. 14, 1893 |
| 624,876 | Sawyer | May 4, 1899 |
| 641,332 | Sadowski | Jan. 16, 1900 |
| 860,084 | Evans | July 16, 1907 |
| 1,127,468 | McGowas | Feb. 9, 1915 |
| 2,308,373 | Keegan | Jan. 12, 1943 |
| 2,347,659 | Burch | May 2, 1944 |
| 2,587,799 | Winter | Mar. 4, 1952 |

FOREIGN PATENTS

| | | |
|---|---|---|
| 324,946 | Germany | Sept. 7, 1920 |